Jan. 6, 1948.  C. H. SAUER  2,434,055
VEHICLE BRAKE MOUNTING MEANS
Filed Aug. 4, 1942  4 Sheets-Sheet 1
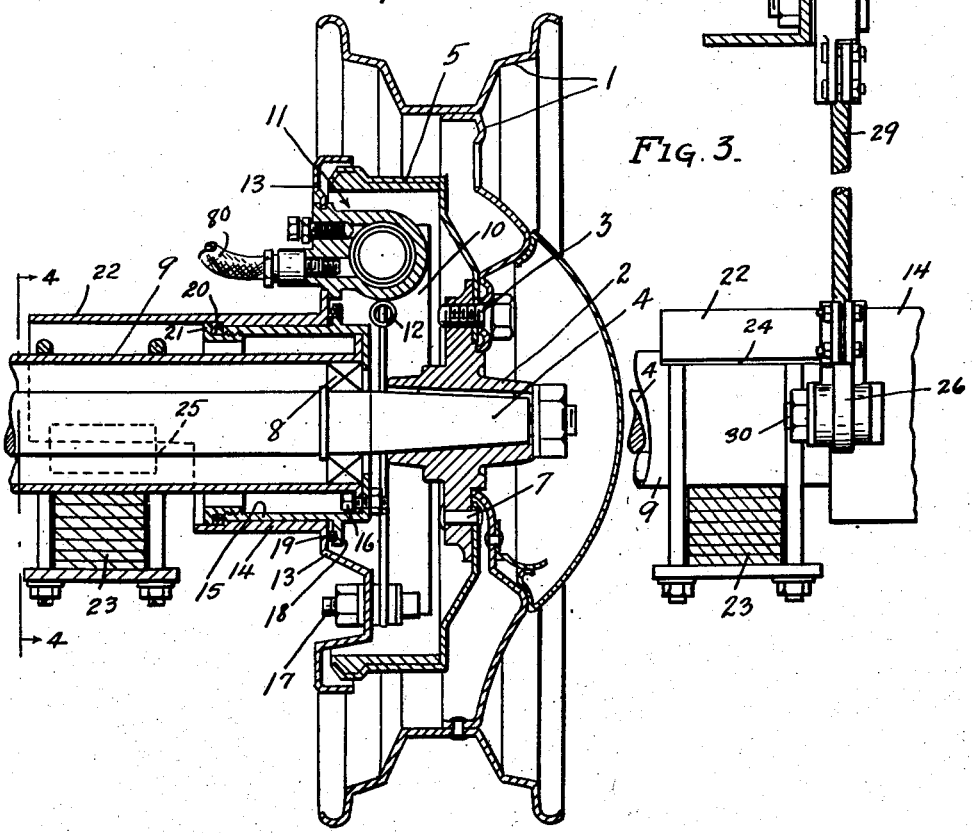
INVENTOR.
CHRISTIAN H. SAUER
BY
Boykin Mohler & Beckley
ATTORNEYS.

Jan. 6, 1948.   C. H. SAUER   2,434,055
VEHICLE BRAKE MOUNTING MEANS
Filed Aug. 4, 1942   4 Sheets-Sheet 2
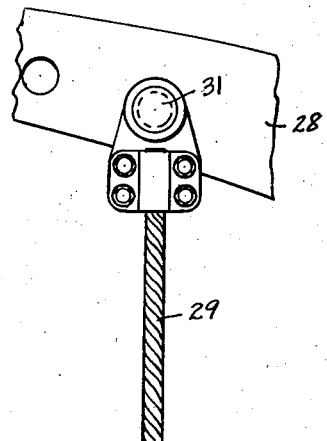
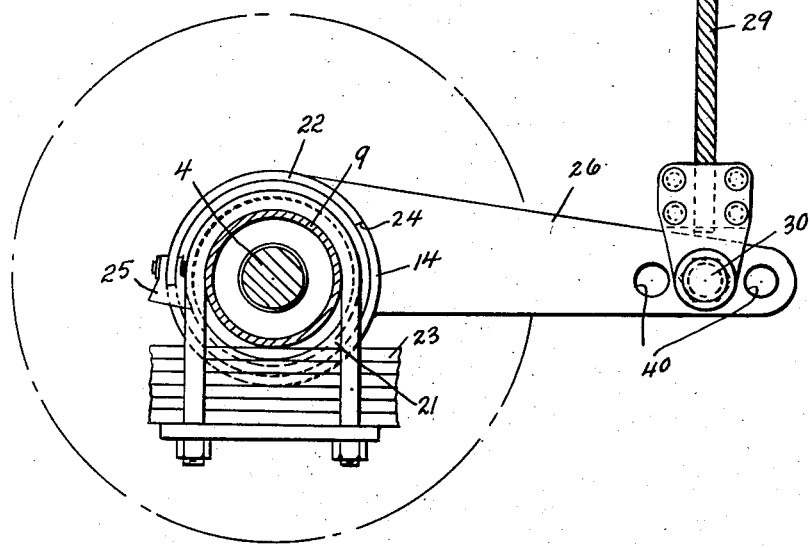
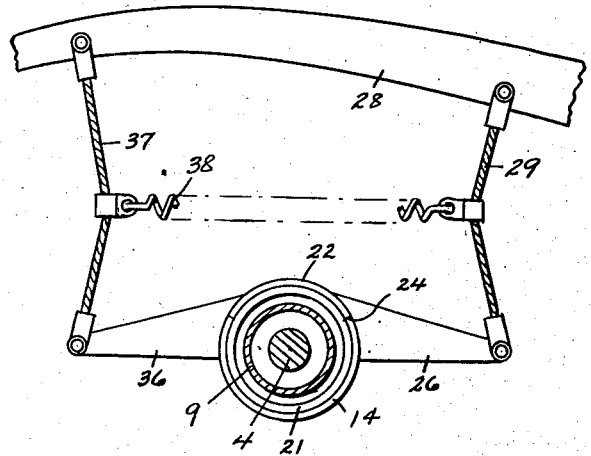
INVENTOR.
CHRISTIAN H. SAUER
BY
Boyken Mohler & Beckley
ATTORNEYS.

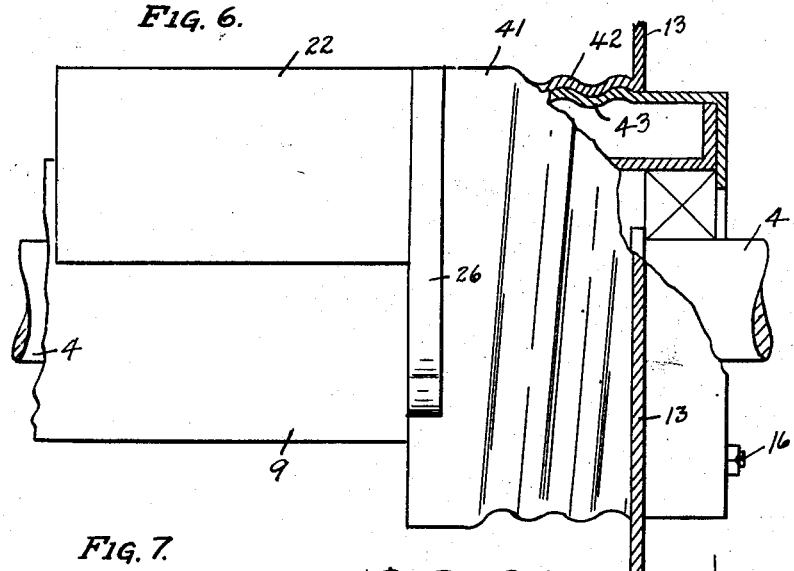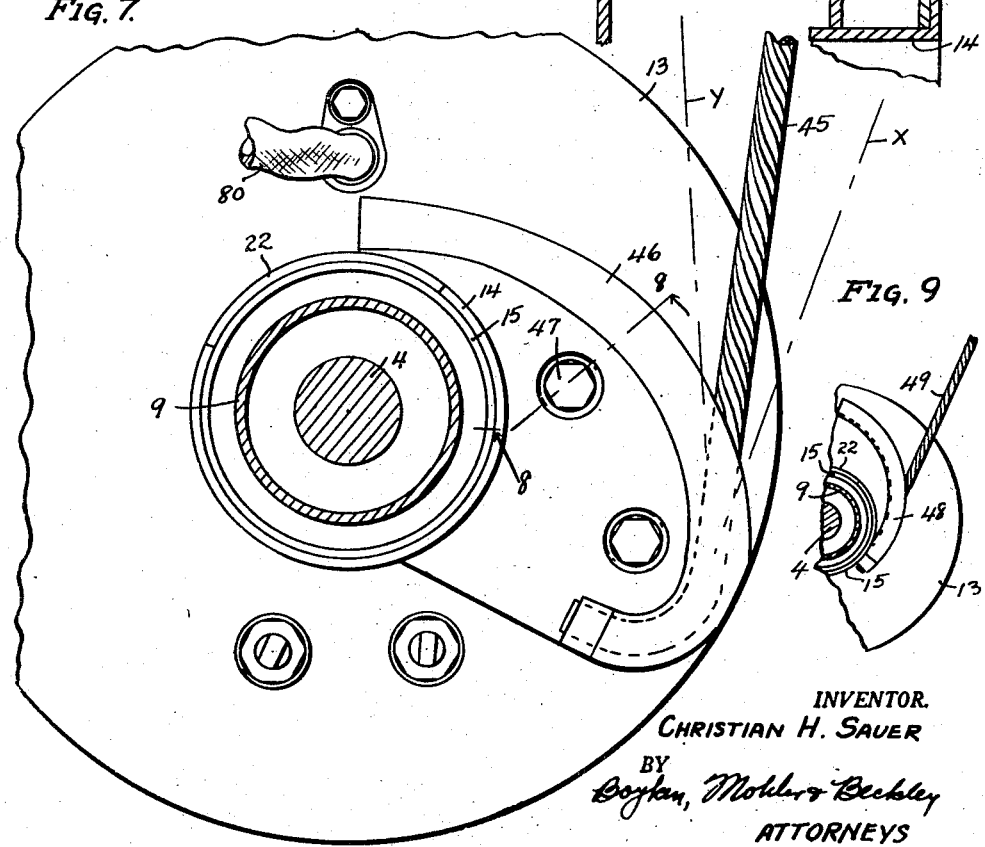

Jan. 6, 1948.  C. H. SAUER  2,434,055
VEHICLE BRAKE MOUNTING MEANS
Filed Aug. 4, 1942  4 Sheets-Sheet 4
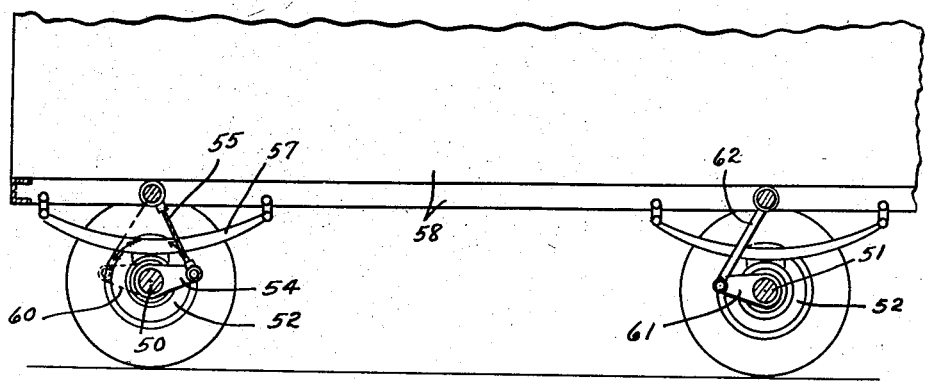
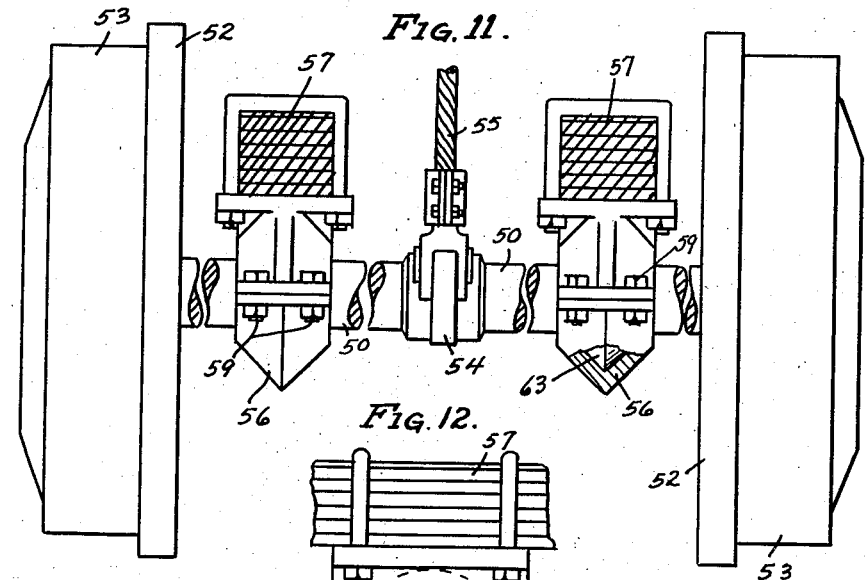
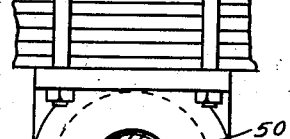
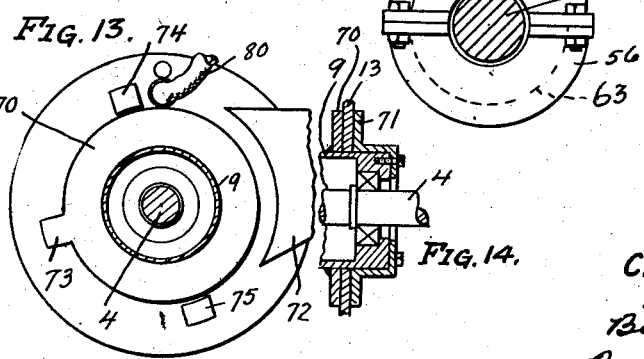
INVENTOR.
CHRISTIAN H. SAUER
BY
Boykin, Mobley & Beckley
ATTORNEYS Patented Jan. 6, 1948

2,434,055

UNITED STATES PATENT OFFICE 2,434,055

VEHICLE BRAKE MOUNTING MEANS

Christian H. Sauer, Chico, Calif., assignor to J. T. Alm, Chico, Calif.

Application August 4, 1942, Serial No. 453,501

11 Claims. (Cl. 188—2)

1

This invention relates to vehicle brakes, and has for one of its objects the provision of an improved brake system arranged and adapted to utilize momentum developed in a rapidly moving wheel mounted vehicle in a manner to substantially eliminate skidding upon strong application of the brakes and to materially increase the road stability of the vehicle at the same time.

Another object of the invention is the provision of simple, rugged, and reliable means in a brake system independently of any modifications in the present spring suspension of the frame and body or of extensive changes in present brake construction, and which means overcomes any tendency of the body and frame to dip or to "nose over" at its leading end relative to the direction of travel of the vehicle when the brakes are applied.

A still further object of the invention is an improved brake system for vehicles in which relative movement between the brake shoe or shoes and the wheel is provided for and also means is provided for revolution of the shoe or shoes with the wheel to a degree dependent upon various factors or combinations thereof such as the rate of speed of the vehicle, the force applied to the brake shoes and the degree of yieldability of the supporting means between the vehicle frame or body and the axle or axle housing that carries the wheels.

Other objects and advantages will appear in the annexed drawings and specifications.

Briefly described, there are several forces developed in a rapidly moving wheel mounted vehicle that have heretofore worked to defeat an efficient, fast and safe slowing down of the vehicle.

Automobile makers, for example, have recognized the fact that in high speed operation of automobiles a sudden and strong application of the brakes frequently causes the operator to lose control of the automobile, even where the braking efficiency was adequate to reduce the speed sufficiently to avoid striking a particular object. The major contributing cause of this loss of control has either been due to skidding, or swerving of the automobile. Also, in such instances where a quick stop is desirable, or a quick reduction in speed, the momentum of the occupants of the automobile or its load has resulted in serious injuries. So far, these troubles still exist although various attempts have been made through complicated spring suspensions and changes in the braking efficiency of the front wheels relative to the rear wheels to solve the problem.

In a rapidly moving vehicle where the frame and body are supported on springs carried by the axles, or on the axles, and the conventional brakes are applied to the rear wheels, the forward momentum of the load carried by the axles plus force of gravity results in reducing the frictional resistance between the ground engaging portions of the braking wheels and the ground. Also the centrifugal force of the rapidly revolving tires operates to further reduce said frictional resistance in all tires. The present hydraulically activated brakes generally provide an excess of braking power, but unless the frictional resistance between the ground engaging portions of the tires and the ground is sufficient to prevent skidding of the tires, this braking power is valueless, and is even worse than valueless since the skidding of the tires results in injury thereto.

With my invention, the frictional resistance between the ground engaging portions of the wheels or tires upon application of the brakes is increased in direct proportion to the force applied to the brakes and is sufficient to substantially eliminate skidding, objectionable swaying of the body and frame, and objectionable displacement of a relatively loose load, even where the road surface is wet in a condition conducive to skidding.

In the drawings,

Fig. 1 is a diagrammatic elevational view of an automobile with an embodiment of my invention indicated in positon relatve to the frame, wheels and body, the latter being indicated in dot-dash lines.

Fig. 2 is a vertical sectional view through a rear braking wheel and part of the axle housing and spring, the pneumatic tire being omitted from the wheel.

Fig. 3 is a fragmentary part sectional and part elevational view of the connection I provide between the brake and frame of the vehicle.

Fig. 4 is a fragmentary sectional view taken along line 4—4 of Fig. 2 with the brake backing plate indicated in dot-dash line.

Fig. 5 is a fragmentary sectional view, partly in elevation, showing a modification of the invention that is disclosed in the preceding views.

Fig. 6 is a construction slightly different from that shown in Figs. 1 to 5, the view being an enlarged fragmentary one partly in elevation and partly in section.

Fig. 7 is a part sectional, part elevational view showing a different form of connection between the backing plate of the brake and the vehicle body or frame than is shown in the preceding views.

Fig. 8 is a fragmentary sectional view taken along line 8—8 of Fig. 7.

Fig. 9 is a reduced size, part sectional, part elevational, fragmentary view of a modified form of the invention with respect to the view of Fig. 7.

Fig. 10 illustrates a form of the invention as applied to a vehicle having a rotatable axle on which the wheels are rotatable, but which has the backing plate secured to the axle.

Fig. 11 is an enlarged elevational view of one pair of brakes on one of the axles of the vehicle of Fig. 10 in which the springs are indicated in section. The axle is broken away in parts and is in section at the broken parts to accommodate the view to the sheet.

Fig. 12 is a fragmentary view of one of the spring supports of Fig. 11, the axle being shown in section.

Fig. 13 is a part sectional, part elevational view of a different form of bearing for the backing plate than that of the preceding views, and in which the arm forming part of the connection between the body and backing plate is directly secured to the latter.

Fig. 14 is a fragmentary, vertical sectional view through the device of Fig. 16.

Description of Figs. 1 to 4

In Fig. 2 is shown a steel wheel 1, which includes the conventional rim for supporting a pneumatic tire (not shown), and which wheel is bolted to the wheel hub 2 by several bolts, one being indicated at 3. The wheel hub is keyed or otherwise suitably secured to the drive axle 4, and the brake drum 5 is also secured to said hub as by rivets, one of which is indicated at 7. A roller bearing 8 is positioned between the axle housing 9 and the axle 4 thus providing for support and rotation of the axle in the stationary housing 9.

The foregoing elements and their arrangement is generally standard in passenger automobiles and in some trucks, although different but equivalent structure may be employed by different makers.

It is conventional practice to provide brake shoes 10 in the brake drum 5, and to actuate such shoes for engagement between the lining thereon and the drum by a hydraulic mechanism such as generally indicated at 11, a spring 12 being provided to hold the shoes 10 retracted from the drum when the hydraulic mechanism is inoperative for applying the brakes.

Heretofore the brake shoes have been anchored at one of their ends to a backing plate that is secured to the axle housing. Thus in the prior structure when the brake shoes engage the brake drum, the torque of the drum is transmitted directly to the axle housing tending to rotate the latter, although this is not actually done since the housing is secured against rotation.

With my invention, the backing plate 13 is provided with a cylindrical hub 14 that is concentric with the axle 4 and rotatable on a bearing 15. This bearing 15 is secured to the axle housing 9 in any suitable manner, but preferably by bolts, one of which is designated 16.

The backing plate 13 may still carry the hydraulic brake shoe mechanism 11, since the latter is connected by a flexible pressure line with a source of fluid, and also the brake shoes are anchored to the backing plate 13, one of which shoes is shown so anchored by bolt 17 in Fig. 2. Radially outwardly from the hub 14 the backing plate 13 may be substantially the same as in conventional brakes.

The bearing 15 may be provided with a radially outwardly projecting flange 18 that extends over the side of the backing plate that carries the brake shoes, and which flange may carry an annular dust and grease protector 19 in slidable contact with the backing plate. Also the hub 14 may be counterbored at its end that is outwardly of the backing plate 13, a packing ring 20 may be held between the shoulder formed at the end of the counterbore and a flange 21 secured on a ring that is threadedly connected with the bearing 15 as indicated in Fig. 2. Thus dust, water and other undesirable matter cannot obtain ingress between bearing 15 and hub 14 to within the brake enclosure and axial movement of the backing plate relative to the bearing and brake drum is prevented.

The hub 14 is provided with an extension 22 (Figs. 2, 3) projecting over the usual vehicle spring 23 that is secured to the axle housing. This extension may be in axial continuation of the hub walls, but is only a segment of the hub, as best indicated in Fig. 4 with the forward edge of the segment (relative to the forward end of the vehicle) terminating at about point 24 a substantial distance from spring 23, while the rear edge of the segmental extension 22 may have a rubber or yieldable bumper 25 covering the same and secured to the extension, and which bumper is also spaced from the spring 23 but a lesser distance than the spacing between edge 24 and said spring.

Rigidly secured to the hub 14 and extending radially outwardly therefrom toward the forward end of the vehicle is an arm 26 (Figs. 1, 3, 4). This arm may extend generally horizontally from said hub, and the outer end preferably terminates at a point between the forward shackle bolt 27 (Fig. 1) of the rear spring and the rear axle. The forward end of said arm is secured to the side frame member 28 of the automobile by a suitable flexible connection such, for example, as cable 29 (Figs. 3, 4).

The ends of the cable 29 may be respectively connected to arm 26 and to frame member 28 by pivots 30, 31 so that upon flexing of the cable the ends of the cable preferably may pivot about horizontal axis parallel with the rear axle to avoid any sharp kinking adjacent their ends.

Description of Fig. 5

In Fig. 5 all elements corresponding to those described for the preceding figures will bear the same numbers. The brake structure is practically identical with that shown in Fig. 4 except that the rubber bumper of Fig. 4 is omitted and the rear edge of the hub projection 22 terminates at about the same level as the forward edge 24.

Instead of there being only a single forwardly projecting arm 26 secured to the hub 14, I also provide an oppositely and rearwardly extending arm 36 that is connected at its outer end with frame member 28 by a cable 37 that is identical with the cable 29 connecting the forward arm with said frame. In order to permit full up and down movement of the body and frame of the vehicle on the springs, I provide a sufficient slack in these cables 29, 37 to permit such full movement and maintain the cables taut by connecting them with a coil spring 38 at points about midway between their ends.

In operation, upon application of the brake shoes to the brake band in the rear wheels of a rapidly moving vehicle, the momentum forces developed are transmitted in a substantially directly downward direction in cables 29 (each rear wheel being identical in the braking system), The result is a direct increase in the frictional resistance between the ground engaging surfaces of the vehicle wheels and the ground, and there is no skidding, swerving, or loss of control of the vehicle and the passengers are not thrown forwardly in the manner heretofore resulting from the strong application of the brakes. The frame and body are pulled downwardly, particularly the rear end thereof, and the sensation to passengers is one of seating more firmly, but gently, against the cushions or seats. The downward force pulling the frame and body downwardly continues as long as the brakes are applied, and if the vehicle is brought to a sudden stop and the brakes locked, there is no up and down swaying or rocking, but the frame and body are stationary.

When the vehicle is moved rearwardly, the cables 29 will flex upon application of the brakes and bumpers 25 will engage the springs to stop reverse rotation of the hubs 14 in the form of the invention of Figs. 1 to 4, or in the form shown in Fig. 5 the arm 36 and cable 37 will function to stop said rotation and pull rear end of vehicle downwardly. Each cable 29 thus provides a one-way-acting means between the body and each rear wheel, that is positively effective for the transmission of energy in one direction, but not in the other. When the vehicle is moving forwardly and the rear brakes are applied, the cables 29 are tensioned and the energy from the wheels is positively transmitted to the body, but the cables 29 are ineffective for transmission of tension or energy when the rear brakes are applied as the vehicle is moving rearwardly.

In the invention as shown in Fig. 5, it is pertinent to note that the hub 14 is held in neutral position at all times by the equalizing effect of the spring 38. Should arms 26 or 36, or cables 29 or 37 break, it is obvious that either the forward or rear edges of projection 22 will engage the vehicle spring and the brakes will be effective for stopping or for slowing down the vehicle. In Fig. 4 this is equally true with respect to the arm 26 and cable 29 shown in said figure.

The arm 26 or arms 26S and 36, as the case may be, may be provided with extra openings such as indicated at 40 in Fig. 3, for the purpose of adjusting the distance between cable 29 (or 36) with respect to the axis of the wheel. The closer the connection between the cable and arm is positioned to the wheel axis the greater will be the force exerted on the cable upon application of the brakes, and this force will decrease progressively as said connection is moved greater distances from said axis. As a practical matter in automobiles having semi-elliptical springs, as illustrated, the preferable point of engagement of each cable 27 with the frame is between the shackle bolts and spaced therefrom and forwardly of the axle.

It is to be understood that the description and drawings are merely illustrative of a preferred embodiment of the invention and is not to be considered restrictive of the form the invention may take.

*Description of Fig. 6*

The elements in this form of the invention that are identical in function and structure to those shown in Figs. 1 to 4, will be similarly numbered.

The backing plate 13 in Fig. 6 is provided with a hub 41 that is formed with threads 42 receiving therein a complementarily threaded bearing 43. The hub 41 and bearing 43 correspond in position and in their general function to hub 14 and bearing 15 of Fig. 2, and the bearing and axle housing 9 are similarly flanged at their ends adjacent the backing plate with bolts 16 extending through the flanges securing them together. Arm 26 secured to hub 41 is identical with the arm 26 of Fig. 4 and is adapted to be connected at its outer end to the frame or body of the vehicle by a cable.

This construction eliminates the flanges 18, 21 that are respectively on the bearing 15 and hub 14 of Fig. 1 since the hub 41 and bearing 42 have a slightly axial movement upon application of the brakes when there is rotation of the hub with the bearing. This axial movement results in the elimination of the tendency of the brake shoes (which are on the backing plate and which move with the hub 41) to wear a concave in the inner side of the drum and increases the efficiency of the brake, as well as securing the backing plate against axial movement beyond the limits caused by relative rotative movement between the hub and bearing. A still further advantage of the threaded hub and bearing connection is found in the facility with which the backing plate may be adjusted to be in the correct axial relation with respect to the brake drum in the first instance. By removing bolts 16 and turning the bearing 43 relative to the axle housing and backing plate, and then rebolting the bearing to the housing, the backing plate and brake shoes will be moved axially in one direction or the other according to the direction of rotation of the bearing.

*Description of Figs. 7, 8*

In this form of the invention, the cable 45 (which generally corresponds to cable 29 of Fig. 4) is secured at one of its ends to the frame or body of the vehicle the same as with cable 29, but its opposite end is secured to one end of an elongated channel-track 46. This so-called track may be bolted to the outer side of backing plate 13, as by bolts 47, or may be welded to the backing plate or formed integrally therewith as may be desired.

The track 46 is positioned generally at the forward side of the wheel axle relative to the forward end of the vehicle and the end to which the cable 45 is secured is adjacent the periphery of the backing plate. From said end, the track curves upwardly and generally toward the axis of the backing plate, and the cable is positioned to be within the channel of the track upon rotation of the backing plate 13 clockwise (as seen in Fig. 7), when the brakes are applied.

As the brakes are applied, and the backing plate is partially revolved clockwise as the result of said application of the brakes, it will be seen that a downward pulling force is transmitted to the cable, at the forward side of the wheel axle and housing. This force gradually increases as the backing plate is revolved due to progressively decreasing distance between the effective pulling point on the cable and the wheel axle. If the particular vehicle carrying the brakes is such that the pull in the body through the cable is more severe than is desired, it is obvious that the point of connection between the cable 45 and the body may be positioned forwardly on the frame or body so that the cable will normally substantially coincide with the dot-dash line X (Fig. 7) or if a stronger pull is desired, the said point of connection may be such that the cable will normally substantially coincide with dot-dash line Y.

In the above construction, it is to be noted that the point where the cable 45 last contacts the track 46 in direction toward the body is generally along a radial line from the wheel axis, and the position of this point relative to the said axis is variable, so that the initial light application of the brakes produces but a relatively small pull on cable 45 which is sufficient to stabilize the body against any tendency to move upwardly, while a progressively stronger application of the brakes will pull the body downwardly to produce a noticeable "squatting" action on the vehicle. Obviously the degree of resiliency of the springs supporting the body will affect the degree to which the body may be pulled downwardly, but in any event, the force transmitted through the cable to the body will be as described.

Description of Fig. 9

This form of the invention varies from that of Fig. 7 only in the fact that the channel track 48 to which cable 49 is secured, and in which it is received, is curved so that the end to which the cable is secured is closer to the wheel axis than the opposite end.

In this form of connection between the backing plate and the body or frame of the vehicle, the force transmitted through cable 49 to the body progressively decreases as the backing plate revolves, assuming the force applied to the brakes is constant.

The circumstances under which the brake is used most commonly, will determine to a great extent whether the arrangement of Fig. 7 is preferable to that shown in Fig. 9. In the arrangement shown in Fig. 9, it is obvious that the progressively increased force applied to the brakes will tend to be offset by the progressively decreasing force transmitted through the cable 49 to the body, so that a more uniform pull may be maintained on the cable than where the two forces are working together as in Fig. 7.

Description of Figs. 10 to 12

The vehicle illustrated in Fig. 10 has a rear axle 50, and a front axe 51. The backing plate 52 of each wheel is rigidly secured to the axle in any desired manner, while the drum 53 of each wheel is freely rotatable on the axle carrying the same. Backing plates 52 carry the conventional hydraulically actuated brake shoes including the usual flexible pressure hose (not shown) for the fluid that actuates the brakes.

Centrally between the ends of axle 50 is a forward.y projecting arm 54 secured to the axle, and the forward or outer end of this arm is connected to the vehicle body or frame by an upwardly extending cable 55.

Axle 50 is rotatable in bearings 56 that carry the springs 57, and which springs in turn carry the frame and body. These bearings may be split and bolted together by bolts 59, each half being in the form of a radially inwardly opening V-channel in cross-section, adapted to enclose a complementary shaped annular projection 63 rigid on axle 50. Thus, any axial movement of the body 58 and bearings 57 relative to the axle is prevented, while the axle may rotate in the bearings.

Upon application of the brake shoes in drums 53, it will be seen that the backing plates 52 which carry the shoes will tend to revolve with the drum, thus revolving axle 50 and exerting a downward pull on cable 55 which is connected with the body 58, resulting in a transmission of this pull to the body thereby pulling the rear end of the body downwardly.

Here again, the actual degree of revolution of the axle by reason of the application of the brakes will be dependent upon the degree of resiliency between the springs 57 and the body.

Assuming that the vehicle is backing up and the brakes are applied, it will be seen that the arm 54 will revolve counter-clockwise (as viewed in Fig. 10) to dotted position 60, again stopping complete revolution of the axle 50 and transmitting a downward pull on he vehicle body.

The only difference between the front end braking system and that described for the rear axle, is the fact that the arm 61 on axle 51 extends rearward.y and a rigid rod 62 connects the outer end of arm 61 with the body instead of a cable.

By this above structure at the front axle 51, it will be seen that application of the brakes on the forward set of wheels will result in an upward thrust on the forward end of the body through rod 62, while an application of the brakes when the vehicle is moving rearwardly will result in a downward pull on the rod 62 causing the trailing end to move downwardly.

The same structure as is shown with respect to the rear ax.e 50, may be used on the front axle, if desired, and, of course, a structure employing a rigid arm or arms on front axles in any vehicle whether a trailer or power driven, may be used to produce an upward thrust on the forward end of a forwardly moving vehicle.

Description of Figs. 13, 14

These views show a modification of the structure shown in Fig. 2, the modification being in the manner in which the backing plate 13 is rotatably supported relative to the axle housing 9.

Instead of using a hub 14 and bearing 15 as shown in Fig. 2, the backing plate 13 may merely be formed at its central opening to rotate on the axle housing, and a pair of similar outwardly projecting flanges 70, 71 are respectively secured to the housing and disposed in substantially frictional engagement with the outer and inner sides of the backing plate.

Arm 72 is secured directly to the backing plate 13, and projects forwardly the same as arm 26 in Fig. 4 for securement of its forward end to the body or frame by a cable such as shown in Fig. 4.

A radially outwardly extending projection 73 on the flange 70 is adapted to engage one or the other of stops 74, 75 in the event of a breakage of arm 72 or the cable connecting the arm with the body, so as to insure operation of the brakes under any condition.

With this construction, the flanges 70, 71 will resist any tendency of the backing plate to cant to one side when the brakes are applied, even though the cable connection between the arm 72 and the body may be slightly inclined out of a vertical plane parallel with the plane of the backing plate.

The foregoing description of the various forms of the invention are not intended to cover all possible variations, since the principle of the invention may be applied to airplanes, railway cars and any form of vehicle that has traction at one time or at all times between the ground or tracks and vehicle supporting wheels.

I am aware of the fact that heretofore certain structure has been disclosed wherein backing plates are not rigidly secured to the stationary axle or axle housings, but in each instance of which I am aware, every effort has been made to prevent any possible rotation of the backing plate relative to the housing or axle when the brakes are applied, and no attempt has been made to utilize the torque of the brake drum to increase the efficiency of the brakes, and to increase the road stability of the vehicle upon application of the brakes. Also, in such previous structures and wherein mechanical brake applying means, such as a brake rod or rods and levers are operably connected with the brake shoes, it is essential that the backing plate be held against rotation in order to prevent breakage in the braking system, and to enable actuation of the brake shoes.

The use of a cable, such as cable 26 in Fig. 4, obviously eliminates the necessity for using ball joints or other complicated structure, since the cable is flexible and will flex to accommodate itself without detrimental strain to any movement of the body relative to the axles. Of course, in the form shown in Fig. 10, the use of a cable or similarly flexible connection is essential to permit the arm 54 to revolve from one side to the other of the axle.

The cable 26, or its application in the other forms of the invention permits its flexing where the brakes are applied as the vehicle is moving rearwardly, thus exerting no action on the vehicle body, and permitting the connection between bumper 25 and spring 23 (Fig. 4) or between projection 73 and stop 74 in Fig. 13 to be effective for stopping rotation of the backing plate.

The flexible hydraulic hose or line indicated at 80 in all views where shown, and which connects with the backing plate, is of a length sufficient to permit any degree of rotation of the backing plate possible with my invention, and this flexibility of this part of the brake actuating means, while preserving its function unimpaired, is important, particularly where there is appreciable flexibility in the body supporting springs, or where there may be a breakage in the arm or cable connecting the backing plate with the body.

Another advantage of my system is that increased braking efficiency may be obtained with lighter brake structure than is now employed, and also the objectionable brake squeal is substantially eliminated by reason of the fact that the brake shoes may revolve to a limited extent with the brake drum when the brakes are applied.

The increase in road stability of a vehicle upon application of the brakes is particularly noticeable where it is necessary to apply the brakes as the vehicle is moving around a curve. The tendency of the body to swing of the axles and over toward the outer side of the curve is resisted by the downward pull transmitted to the body from the backing plate and this resistance is increased with an increase in the force applied to the brakes.

I am also aware of prior efforts to combine a special spring suspension for vehicle frames and bodies with relatively complicated linkages for the purpose of stabilizing the movement of vehicle bodies on the wheels, but insofar as I am aware, none of these structures provide for an effective and efficient system adapted to function to accomplish the results of my invention in the same or similar manner.

The drawings and description are not intended to be restrictive to the precise structure shown and described, and where the body of the vehicle is referred to in the claims, this description is intended to include the body-supporting frame or whatever load whether the frame or the body, that is supported on the springs where springs are used.

Having described my invention, I claim:

1. A vehicle comprising front and rear wheels and a body sprung thereon, a brake drum fixed to a rear wheel, a brake shoe cooperable with said drum, a carrier for said shoe capable of movement with said shoe upon engagement of said shoe with said drum when said drum is rotating, and one-way-acting means connecting said carrier and body effective to transmit the said movement of said carrier to said body to tend to move the rear end of the body downwardly relative to said rear wheel during braking when the vehicle is moving forwardly, and means other than said connecting means for limiting reverse movement of said carrier upon engagement of said shoe with said drum during reverse travel of the vehicle.

2. A vehicle comprising front and rear wheels and a body sprung thereon, a brake drum fixed to a rear wheel, a brake shoe cooperable with said drum, a carrier for said shoe capable of movement with said shoe upon engagement of said shoe with said drum when said drum is rotating, and one-way-acting means connecting said carrier and body effective to transmit the said movement of said carrier to said body to tend to move the rear end of the body downwardly relative to said rear wheel during braking when the vehicle is moving forwardly, means for limiting the movement of said carrier upon separation of said connecting means during forward travel of the vehicle, and means other than said connecting means for limiting reverse movement of said carrier upon engagement of said shoe with said drum during reverse travel of the vehicle.

3. A vehicle comprising front and rear wheels and a body sprung thereon, a brake drum fixed to a rear wheel, a brake shoe cooperable with said drum, a carrier for said shoe pivotally mounted to enable the carrier to follow the shoe when the shoe is engaged with the drum during drum rotation, means connecting said body and said carrier and engaging the latter eccentrically thereof, said connecting means being positively effective for the transmission of tension only, the arrangement being such that said member is tensioned when the shoe is engaged with the drum during forward travel of the vehicle to tend to move the rear end of the body downwardly relative to said rear wheel, and means other than said connecting means limiting the pivoting of said carrier engaged with the drum during reverse travel of the vehicle.

4. A vehicle comprising front and rear wheels and a body sprung thereon, a brake drum fixed to a rear wheel, a brake shoe cooperable with said drum, a carrier for said shoe pivotally mounted to enable the carrier to follow the shoe when the shoe is engaged with the drum during drum rotation, means connecting said body and said carrier and engaging the latter eccentrically thereof, said connecting means being positively effective for the transmission of tension only, the arrangement being such that said member is tensioned when the shoe is engaged with the drum during forward travel of the vehicle to tend to move the rear end of the body downwardly relative to said rear wheel, means limiting the pivoting of said carrier upon separation of said connecting means during such engagement, and connecting means other than said connecting means limit- means other than said connecting means limiting the pivoting of said carrier engaged with the drum during reverse travel of the vehicle.

5. In a wheel mounted vehicle including a body supported on the wheels thereof and a brake element secured to one of said wheels for rotation therewith about the axis of the latter, a brake shoe movable into and out of frictional engagement with said element, a support for said shoe revolvable about said axis and supporting said shoe for movement therewith, a cable secured at one of its ends to said support and at the other end to said body at points spaced outwardly of said axis for transmitting torque from said support to said body in a downward direction upon frictional engagement between said shoe and said element, said cable being adapted to flex upon a reversal of the direction of revolution of said support to prevent upward thrust to said body being transmitted through said cable, and stop means independently of said cable limiting revolvable movement of said support upon such reversal of the direction of revolution of said member.

6. In combination with a pair of coaxial ground wheels supporting a vehicle body thereon each of which wheels is provided with a brake drum and a backing plate coaxial therewith having a brake shoe secured thereto for movement of the shoe into and out of functional engagement with said drum, a flexible link connecting each backing plate to said body and disposed in a generally vertically disposed plane parallel with the plane of each wheel and forwardly of the axis of the latter, means carried by each backing plate securing one of said links thereto and supporting that portion thereof adjacent each backing plate for movement toward and away from said axis upon revolution of said backing plate, each of said links being positioned within the laterally projected area of the ground wheels respectively adjacent thereto, said means for supporting each of said portions of said links comprising a curved track secured to said backing plate, and each of said links being secured in said track at one of its ends.

7. A vehicle comprising front and rear wheels and a body sprung thereon, a brake drum fixed to a rear wheel, a brake shoe cooperable with said drum, a carrier for said shoe capable of movement with said drum in either direction, and connecting means between said body and carrier including a one-way-acting member effective to transmit movement of said carrier to said body to tend to move the rear end of said body downwardly relative to said rear wheel when the brake is applied during forward movement, said carrier being so arranged that said member will serve to limit reverse rotation of said carrier when the brake is applied during reverse movement of the vehicle.

8. In a vehicle comprising front and rear wheels, mounting means for said rear wheels, a body sprung on said mounting means, vertically elongated connecting means between said mounting means and said body adapted for universal lateral movement of its ends free from detrimental strain in itself and on said body and mounting means upon unequal vertical springing of said rear wheels relative to said body and positively effective for the transmission of tension forces, cooperating brake means for said rear wheels respectively, brake applying means unaffected by the springing movement of said body or by vertical springing movements of said mounting means for transmitting power to said brake means for uniformly actuating the latter, means energized upon brake application for tensioning said connecting means uniformly in direct ratio to the degree of power transmitted by said brake applying means thereby transmitting equal torque from said rear wheels to the rear end of said body in a downward direction whereby the tendency toward skidding said wheels on the ground is substantially eliminated.

9. In a vehicle having a pair of rear wheels and a body sprung thereon, brake drums respectively fixed to each rear wheel, brake shoes respectively cooperable with each of said drums, a carrier oscillable on the axis of each drum and carrying one of said shoes, a fluid motor for each of said shoes mounted on such carrier, a flexible fluid pressure line extending to each motor for conducting fluid thereto under identical and uniform pressure to said motors throughout the range of oscillation of said carriers for brake application unaffected by unequal springing of said wheels relative to said body and a vertically elongated connection between carrier and said body having substantially universal lateral movement of its ends free from detrimental strain in itself and on said carrier and body upon said unequal springing, said connection being arranged and adapted to transmit equal torque from said drums to said body whereby the tendency of said rear wheels to skid will be substantially eliminated.

10. A safety torque transmitting device for each of the rear wheels of a motor vehicle comprising a backing plate for a brake shoe, a fluid actuatable motor carried by said backing plate for actuating said shoe, an annular bearing member rotatably supporting said backing plate, means for removably securing said member on the end of an axle housing adapted to support such wheels, rigid means rigid with said backing plate extending axially and radially of the axis of said backing plate to a point spaced horizontally outwardly of said axis and backing plate a radial distance substantially less than the diameter of said backing plate, a link, pivot means connecting one end of said link with said rigid means at said point and pivot means for pivotally connecting the opposite end of said link with the frame of such vehicle with said link extending generally vertically, said link including each of said pivot means being adapted to provide for universal lateral movement of the ends of said link substantially free from detrimental strain on said link and on said rigid means when said device is on such vehicle and the pivot means at the end of said link opposite said rigid means is pivotally secured to such frame.

11. In a wheel mounted vehicle including a body and frame therefor sprung on front and rear wheels and having brake drums respectively secured to said rear wheels for rotation therewith, a brake shoe movable into and out of engagement with each of said drums, a support for each of said shoes supporting each shoe for revolvable movement in opposite directions about the axis of each wheel and relative to each drum, a connection between said body and each of said supports including arms rigid with said supports and respectively extending radially outwardly of said supports to points adjacent the peripheries of said wheels and axially spaced from said wheels and a link connecting the outer end of each arm with said frame, safety means adjacent each support providing stops for positively limiting revolvable movement of each support in either of opposite directions, said arms extending forwardly from said supports toward said front wheels, said points at the outer ends of said arms being substantially below said frame, and said links extending substantially vertically to said frame.

CHRISTIAN H. SAUER.

REFERENCES CITED

The following references are of record in the file of this patent:

UNITED STATES PATENTS

| Number | Name | Date |
|---|---|---|
| 1,605,404 | Hewitt | Nov. 2, 1926 |
| 1,710,352 | Dodge | Apr. 23, 1929 |
| 1,755,830 | Loughead | Apr. 22, 1930 |
| 2,078,210 | Sanford | Apr. 20, 1937 |

FOREIGN PATENTS

| Number | Country | Date |
|---|---|---|
| 290,442 | Germany | Feb. 29, 1916 |